United States Patent
Chrisop et al.

(10) Patent No.: US 7,212,306 B2
(45) Date of Patent: May 1, 2007

(54) SYSTEM AND METHOD FOR ALLOCATING RANDOM ACCESS MEMORY IN A MULTIFUNCTION PERIPHERAL DEVICE

(75) Inventors: Roy Kenneth Chrisop, Camas, WA (US); Daniel Leo Klave, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 833 days.

(21) Appl. No.: 09/944,923

(22) Filed: Aug. 31, 2001

(65) Prior Publication Data

US 2003/0043638 A1    Mar. 6, 2003

(51) Int. Cl.
*G06F 15/00* (2006.01)
(52) U.S. Cl. ............... 358/1.16; 358/1.15; 358/1.14; 358/1.13; 358/1.9
(58) Field of Classification Search ............ 358/1.16, 358/1.13, 1.15, 1.9, 1.14
See application file for complete search history.

(56) References Cited

U.S. PATENT DOCUMENTS

| | | | |
|---|---|---|---|
| 5,159,681 A | 10/1992 | Beck et al. | 395/425 |
| 5,247,674 A * | 9/1993 | Kogure | 711/170 |
| 5,522,017 A | 5/1996 | Ueda | 395/115 |
| 5,659,670 A * | 8/1997 | AuClair | 358/1.16 |
| 5,663,805 A * | 9/1997 | Asai | 358/404 |
| 5,689,730 A * | 11/1997 | Wakasugi | 710/56 |
| 5,805,777 A * | 9/1998 | Kuchta | 358/1.13 |
| 5,999,709 A | 12/1999 | Fiala et al. | 395/114 |
| 6,181,893 B1 | 1/2001 | Collard et al. | 399/80 |
| 6,353,844 B1 * | 3/2002 | Bitar et al. | 718/102 |
| 6,515,756 B1 * | 2/2003 | Mastie et al. | 358/1.15 |
| 6,999,188 B1 * | 2/2006 | Ashe | 358/1.15 |

FOREIGN PATENT DOCUMENTS

| | | | |
|---|---|---|---|
| JP | 07273957 | | 10/1995 |
| JP | 07273957 A | * | 10/1995 |

* cited by examiner

Primary Examiner—Kimberly Williams
Assistant Examiner—Andrew Lam
(74) Attorney, Agent, or Firm—Law Office of Gerald Maliszewski; Gerald Maliszewski

(57) ABSTRACT

A system and method are provided for adaptively allocating random access memory (RAM) in an multifunctional peripheral (MFP) device with a plurality of components. The method comprises: supplying an interface; and, in response to interface prompts, selecting the allocation of RAM for MFP features or components. Typically, the MFP device includes fax, scanner, printer, and copier components, and the method further comprises selecting the allocation of RAM for MFP components selected from the group including fax, scanner, printer, or copier. The method further comprises: selecting the allocation of RAM for MFP features selected from the group including post script (PS) documents, printer control language (PCL) documents, tagged image file format (TIFF) documents, or portable document format (PDF) documents.

Supplying an interface includes supplying front panel graphical user interface (GUI) to present RAM allocation options, and selecting the allocation of RAM for MFP functions in response to interface prompts includes allocating portions of RAM in response to GUI prompts. Alternately, the MFP is connected to a computer workstation with a display. Then, supplying an interface includes receiving a request from a browser loaded on the computer workstation and, from an embedded web server in the MFP, supplying a GUI to the computer workstation display, presenting RAM allocation options.

20 Claims, 3 Drawing Sheets

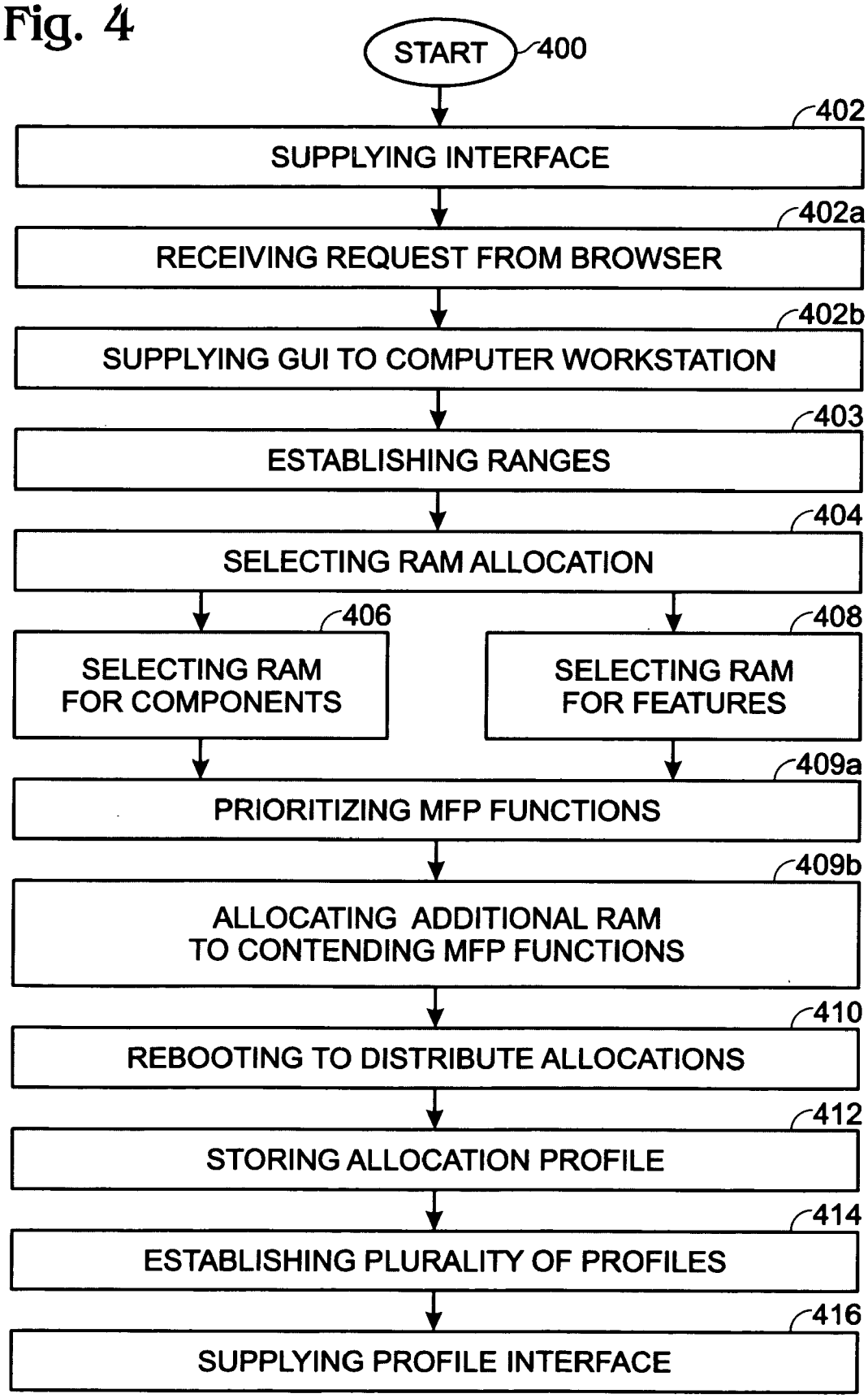

SYSTEM AND METHOD FOR ALLOCATING RANDOM ACCESS MEMORY IN A MULTIFUNCTION PERIPHERAL DEVICE

BACKGROUND OF THE INVENTION

1. Field of the Invention

This invention generally relates to multifunction peripheral (MFP) devices and, more particularly to a system and method for controlling random access memory (RAM) allocation in embedded control systems for MFP products.

2. Description of the Related Art

Multifunction peripheral products are conglomerations of many independent components: Fax, Copier, Printer, and Scanner. When sharing a common microprocessor-based platform, each of these components requires its own separate RAM memory areas for operation. The "random" in RAM means that the contents of each byte can be directly accessed without regard to the bytes before or after it. In any given memory configuration for the device, the developer must make a best "guess" as to the amount of RAM that should allocated to each component, given that the total device RAM is limited. This estimate does not take special use cases into consideration, and doesn't permit the device to be tuned or adjusting after the product is released.

RAM is used to access the component operating system, and to store jobs to be processed by each respective component. For example, a MFP device may have 160 megabytes (MB) of RAM. 40 MB may be allocated to the copier, 50 MB to the printer, 40 MB to the scanner, and 30 MB to the fax. If the copier operating system occupies 10 MB of RAM, 30 MB of RAM remain for the temporary storage of documents to be printed. If a 35 MB print job is to be processed, the job will be slowed as the documents cannot be accessed efficiently. The slow printing process will occur even though large amounts of RAM (assigned to the other components) remains unoccupied.

One obvious solution to the problem is to increase the amount of RAM. However, RAM is expensive and user demands for MFP capacity continue to increase. Additional memory, such as Flash can be added to the MFP, but the access times are poor compared to RAM. Prior art solutions to this problem use dynamic memory allocation relating to font caching, adaptive data compression, band buffers for pages, and communication buffers. Prior art handles memory management in one of two ways: Static or Dynamic.

Static memory allocation, as defined during product development, fixes the amount of memory allocated to each component in the system. Flexible systems that allow the user to add memory to the device typically utilize a lookup table to determine the allocation of memory to each of the various system components.

Dynamic memory allocation allows the system to reapportion memory allocated to other components to solve a temporary memory shortfall. This is usually a temporary state and the memory allocation returns to its original design time definitions. As is well known, dynamic memory typically includes static allocations to each of the MFP components, as well as a large piece of memory called a "heap". As a component, such as the printer, runs out of memory, it will use the heap for storage. This prevents other components form using the heap, even if their need is more pressing. Contention for the heap prevents dynamic memory from being a viable solution to RAM allocation, as the RAM allocation must be well balanced for the MFP to operate effectively with respect to all its components.

It would be advantageous if the efficiency of an MFP device was not limited by the RAM allocations.

It would be advantageous if the allocation of RAM to the various components of an MFP could be made adaptively, according the need on the user.

It would be advantageous if the user could select and control the allocation of RAM to the MFP components.

SUMMARY OF THE INVENTION

This invention provides a user interface, such as a front panel or web page, that permits a user, at boot time, to fine tune the RAM memory allocated for each component. This control provides the user with the ability to fine tune the device for their specific application, and allows them to increase the performance of the device accordingly. That is, the present invention permits a user to adaptively modify the RAM allocated to components in an MFP.

Accordingly, a method is provided for adaptively allocating random access memory (RAM) in an MFP device with a plurality of components. The method comprises: supplying an interface; and, in response to interface prompts, selecting the allocation of RAM for MFP features or components.

Typically, the MFP device includes fax, scanner, printer, and copier components, and the method further comprises selecting the allocation of RAM for MFP components such as a fax, scanner, printer, or copier. Alternately, the method further comprises: selecting the allocation of RAM for MFP features selected from the group including post script (PS) documents, printer control language (PCL) documents, tagged image file format (TIFF) documents, or portable document format (PDF) documents.

Supplying an interface includes supplying front panel graphical user interface (GUI) to present RAM allocation options, and selecting the allocation of RAM for MFP functions in response to interface prompts includes allocating portions of RAM in response to GUI prompts. Alternately, the MFP is connected to a computer workstation with a display. Then, supplying an interface includes receiving a request from a browser loaded on the computer workstation and, from an embedded web server in the MFP, supplying a GUI to the computer workstation display, presenting RAM allocation options.

Additional details of the above-described method for adaptively allocation RAM for an MFP device, and a system for adaptively allocating RAM in an MFP device with a plurality of components are provided below.

BRIEF DESCRIPTION OF THE DRAWINGS

FIG. 4 is a flowchart illustrating the present invention method for adaptively allocating RAM in an MFP device with a plurality of components.

DETAILED DESCRIPTION OF THE PREFERRED EMBODIMENTS

Some portions of the detailed descriptions that follow are presented in terms of procedures, steps, logic blocks, codes, processing, and other symbolic representations of operations on data bits within a microprocessor or memory. These descriptions and representations are the means used by those skilled in the data processing arts to most effectively convey the substance of their work to others skilled in the art. A procedure, microprocessor executed step, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a microprocessor device. It has proven convenient at times, principally for reasons of common usage, to refer to these signals as bits, values, elements, symbols, characters, terms, numbers, or the like. Where physical devices, such as a memory are mentioned, they are connected to other physical devices through a bus or other electrical connection. These physical devices can be considered to interact with logical processes or applications and, therefore, are "connected" to logical operations. For example, a memory can store or access code to further a logical operation, or an application can call a code section from memory for execution.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "translating" or "displaying" or "prompting" or "supplying" or "allocating" or "establishing" or "selecting" or "storing" or "receiving" or "determining" or "displaying" or "recognizing" or the like, refer to the action and processes of in a microprocessor system that manipulates and transforms data represented as physical (electronic) quantities within the computer system's registers and memories into other data similarly represented as physical quantities within the wireless device memories or registers or other such information storage, transmission or display devices.

Figure 1:
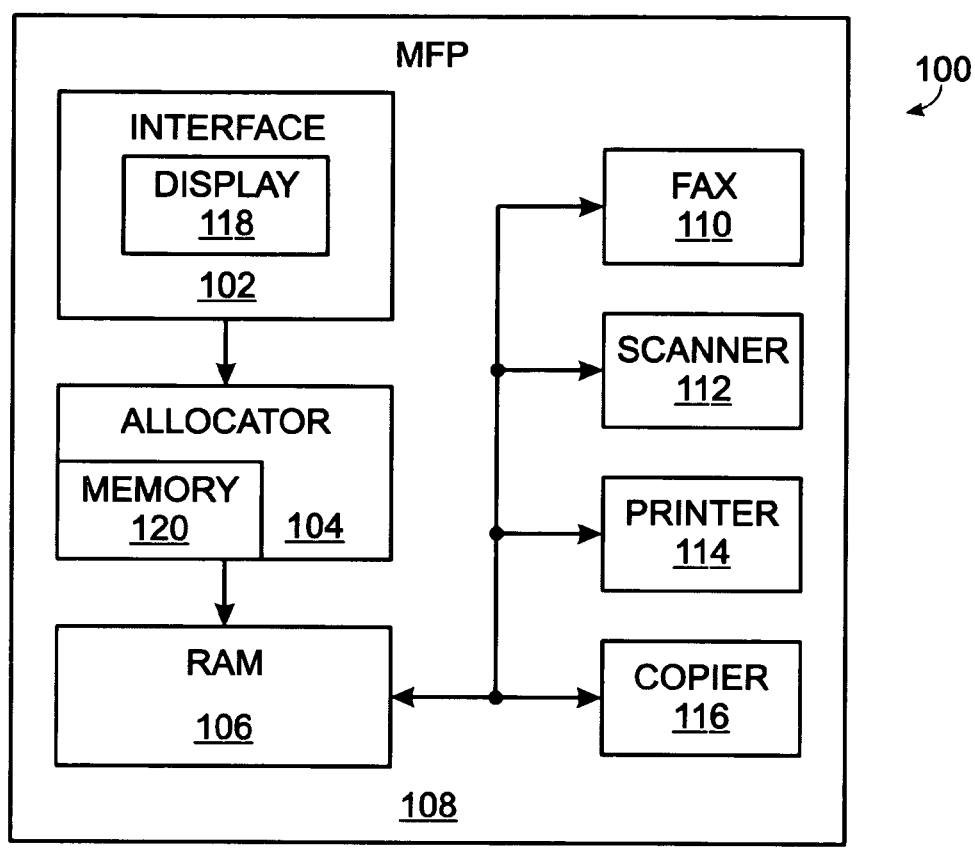
FIG. 1 is a schematic block diagram of the present invention system for adaptively allocating RAM in an MFP device with a plurality of components.

FIG. 1 is a schematic block diagram of the present invention system for adaptively allocating RAM in an MFP device with a plurality of components. The system 100 comprises an interface 102 to provide RAM allocation prompts, and an allocator 104 to allocate RAM for MFP functions in response to interface prompts. The system 100 further comprises RAM 106. The RAM 106 is allocated to the temporary storage of documents for processing by the MFP 108 in response to MFP functions. The MFP device 108 includes a fax component 110, a scanner component 112, a printer component 114, and a copier component 116.

The allocator 104 allocates RAM for MFP functions for either MFP components or MFP features, in response to interface 102 prompts. When the allocator 104 allocates RAM 106 for MFP components 110–116, the interface 102 supplies prompts for selecting the allocation of RAM for MFP components such as fax 110, the scanner 112, the printer 114, or the copier 116.

Likewise, the allocator 104 allocates RAM 106 for MFP features in response to interface 102 prompts. Then, the interface 102 supplies prompts for selecting the allocation of RAM for MFP features selected from the group including post script (PS) documents, printer control language (PCL) documents, tagged image file format (TIFF) documents, and portable document format (PDF) documents. Further, RAM allocation can be selected for a combination of features and components.

The system 100 further comprises a MFP front panel display 118. The interface 102 is then a graphical user interface (GUI) to present RAM allocation options on the display 118, and the allocator 104 allocates RAM 106 for MFP functions in response to GUI prompts on the display 118. Although not shown, the interface can also include a keypad, touchscreen, mouse, or the like to communicate user selections in response to interface prompts.

Figure 2:
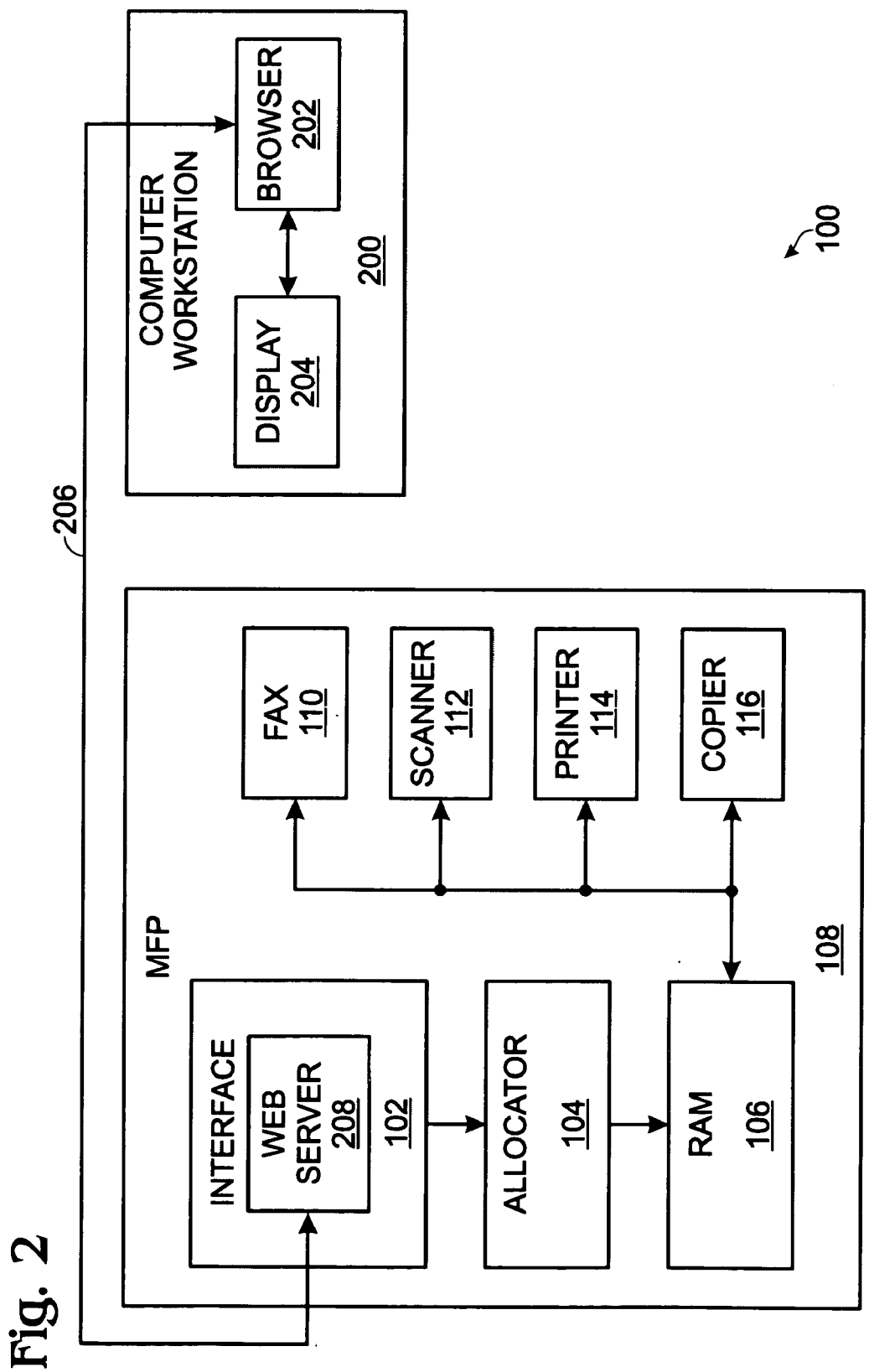
FIG. 2 is a schematic block diagram featuring an alternative aspect of the present invention system of FIG. 1.

FIG. 2 is a schematic block diagram featuring an alternative aspect of the present invention system 100 of FIG. 1. Several of the elements of FIG. 2 are the same as shown in FIG. 1. However, this aspect of the system further comprises a computer workstation 200 including a browser 202 and a display 204 that are network-connected, on network 206, to the MFP 108. Then, the interface 102 includes an embedded web server 208 in the MFP 108. The web server 208 is responsive to computer workstation browser 202 requests, to supply a GUI on the computer workstation display 204 presenting RAM allocation options. Note that the system may also include both an MFP front panel interface and a computer workstation browser interface.

Typically, the allocator 104 operates within predetermined ranges to limit each RAM allocation. It is also typical that the interface 102 presents a memory configuration table GUI cross-referencing MFP functions to their respective RAM memory allocations. Then, the allocator 104 allocates RAM for MFP functions in response to the memory configuration table GUI.

Figure 3:
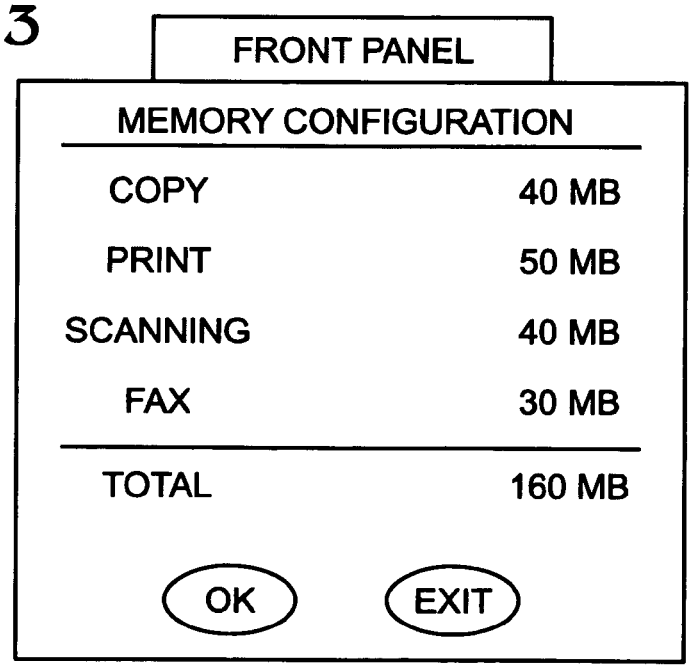
FIG. 3 is an exemplary front panel GUI, such as might be seen by a user selecting an allocation of RAM for an MFP device.

FIG. 3 is an exemplary front panel GUI, such as might be seen by a user selecting an allocation of RAM for an MFP device. As shown, 40 megabytes (MB) have been allocated to the copier component, 50 MB to the printer component, 40 MB to the scanner component, and 30 MB to the fax component. The total amount of RAM allocated is 160 MB. For most MFPs, the allocator 104 is rebooted following the allocation of RAM for MFP functions, to distribute the RAM allocations to their respective functions.

In some aspects of the invention the interface 102 supplies prompts to prioritize the MFP functions. Then, the allocator 104 allocates additional RAM 106 to a contending MFP function with the higher priority, in the event of contention for RAM 106 between MFP functions.

In some aspects of the invention, as shown in FIG. 1, the system 100 further comprises a memory 120 to store selected RAM allocations as a plurality of allocation files. Then, the interface 102 supplies prompts to select stored allocation profiles from memory 120. In other aspects, the interface 102 supplies a GUI of predetermined allocation tables, and the allocator 104 allocates RAM 106 for MFP functions in response to allocation table interface prompts.

SYSTEM OPERATION

The present invention system permits a user to have control over the memory distribution for each of the major components in the system. The user has a front panel or web page interface into the system to set the amount of memory that will be allocated at system boot time. Limits may be imposed on these allocations based on the amount of installed memory and/or the minimum memory required for operation of a individual component. However, any flexibility between these ranges is up to the user of the device.

Either through a front panel or a web page configuration page, a RAM allocation table in the system permits the user to make modifications for each of the system components. When the allocations have been completed and confirmed by the user, the table is modified and the system is typically rebooted in order to distribute the new memory allocation to the system components. In some aspects of the invention, the memory resources are allocated without rebooting, but a typical embedded system does not permit this amount of control over the memory resources.

The system permits memory distribution to be limited by the amount of installed memory and minimal requirements determined by the system designers. It may also be determined that an upper limit to memory allocation exists, above which no further performance gains will be realized.

In some circumstances it is beneficial to give the user the ability to assign priorities to the various components of the system as an additional element to the memory allocations. This option helps to set precedence when memory contention issues arise, and the system needs to decide which component has a higher priority need for memory. This functionality is extends to permitting a user to create multiple memory allocation profiles that are selected in response to the type of task being performed by the device. A large Network Scanning job, for example, may require almost all of the available memory. The user can select a specific memory allocation profile, thus increasing the throughput and performance for this application.

FIG. 4 is a flowchart illustrating the present invention method for adaptively allocating RAM in an MFP device with a plurality of components. Although the method is depicted as a sequence of numbered steps for clarity, no order should be inferred from the numbering unless explicitly stated. The method starts at Step 400. Step 402 supplies an interface. Step 404, in response to interface prompts, selects the allocation of RAM for MFP functions. Selecting the allocation of RAM for MFP functions includes selecting RAM for MFP components and MFP features.

Typically, the MFP device includes fax, scanner, printer, and copier components. Selecting the allocation of RAM for MFP functions in Step 404 includes selecting the allocation of RAM for MFP components. Then, the method comprises a further step. Step 406 selects the allocation of RAM for MFP components such as the fax, the scanner, the printer, or the copier.

Alternately, selecting the allocation of RAM for MFP functions in Step 404 includes selecting the allocation of RAM for MFP features. Then, the method includes a further step. Step 408 selects the allocation of RAM for MFP features selected from the group including post script (PS) documents, printer control language (PCL) documents, tagged image file format (TIFF) documents, and portable document format (PDF) documents. Although the figure shows Step 406 and 408 as parallel paths, RAM can also be allocated for a combination of features and components.

Supplying an interface in Step 402 includes supplying a graphical user interface (GUI) to present RAM allocation options. Then, selecting the allocation of RAM for MFP functions in response to interface prompts in Step 404 includes allocating portions of RAM in response to GUI prompts.

In some aspects of the invention, the MFP has a front panel display. Then, supplying an interface in Step 402 includes supplying a GUI on the MFP front panel to present RAM allocation options. In other aspects the MFP is connected to a computer workstation with a display. Then supplying an interface in Step 402 includes substeps. Step 402a receives a request from a browser loaded on the computer workstation. Step 402b, from an embedded web server in the MFP, supplies a GUI to the computer workstation display, presenting RAM allocation options.

In some aspects of the invention a further step, Step 403, establishes predetermined ranges to limit each RAM allocation. Then, selecting the allocation of RAM for MFP functions in Step 404 includes allocating portions of RAM to respective MFP functions within the range of established allocation limits.

In some aspects of the invention supplying a GUI to present RAM allocation options in Step 402 includes presenting a memory configuration table cross-referencing MFP functions to their respective RAM memory allocations.

A further step, Step 410, reboots the MFP device to distribute the RAM memory allocations to their respective functions following selecting the allocation of RAM for MFP functions.

Some aspects of the invention include additional steps. Step 409a, in response to interface prompts, prioritizes the MFP functions. Step 409b, in the event of contention for RAM between MFP functions, allocates additional RAM to the contending MFP function with the higher priority.

Step 412, following the selecting of the allocation of RAM for MFP functions, stores the allocations as an allocation profile. Step 414 establishes a plurality of stored allocation profiles. Step 416 supplies an interface to select allocation profiles.

In some aspects of the invention, supplying an interface in Step 402 includes supplying a GUI to present predetermined allocation tables. Then, selecting the allocation of RAM for MFP functions in response to interface prompts in Step 404 includes selecting the allocations from the presented allocation tables.

A system and method have been provided for allocating RAM in a MFP device. A few examples have been given of the interfaces that can be used. Examples have also been given for specific RAM allocations and the uses of the allocated RAM. However, other variations and embodiments will occur to those skilled in the art.

We claim:

1. In a multifunction peripheral (MFP) device with a plurality of functions, a method for allocating random access memory (RAM), the method comprising: supply an MFP user interface; and, using the user interface for selecting a percentage of RAM allocated to a document format wherein selecting the percentage of RAM allocated for the document format includes selecting the allocation of RAM for a document format selected from the group including post script (PS) documents, printer control language (PCL) documents; tagged image file format (TIFF) documents, and portable document format (PDF) documents.

2. The method of claim 1 wherein supplying a user interface includes supplying a graphical user interface (GUI) to present RAM allocation options; and,
   wherein selecting the percentage of RAM allocation includes allocating portions of RAM in response to GUI prompts.

3. The method of claim 2 in which the MFP has a front panel display; and,
   wherein supplying a user interface includes supplying a GUI on the MFP front panel to present RAM allocation options.

4. The method of claim 2 in which the MFP is connected to a computer workstation with a display;
   wherein supplying a user interface includes:
     receiving a request from a browser loaded on the computer workstation; and, from an embedded web server in the MFP, supplying a GUI to the computer workstation display, presenting RAM allocation options.

5. The method of claim 2 further comprising:
establishing predetermined ranges to limit each RAM allocation; and,
wherein selecting the percentage of RAM allocation includes allocating portions of RAM to document formats within the range of established allocation limits.

6. The method of claim 2 wherein supplying a GUI to present RAM allocation options includes presenting a memory configuration table cross-referencing document formats to their respective RAM memory allocations.

7. The method of claim 1 further comprising:
following selecting the allocation of RAM for document formats, rebooting the MFP device to distribute the RAM memory allocations.

8. The method of claim 1 further comprising:
in response to user interface prompts, prioritizing the document formats; and,
in the event of contention for RAM between document formats, allocating additional RAM to the contending document format with the higher priority.

9. The method of claim 1 further comprising:
following the selecting of the allocation of RAM for document formats, storing the allocations as an allocation profile;
establishing a plurality of stored allocation profiles; and,
supplying a user interface to select allocation profiles.

10. The method of claim 1 wherein supplying a user interface includes supplying a GUI to present predetermined allocation tables; and,
wherein selecting the percentage of RAM allocation includes selecting the allocations from the presented allocation tables.

11. In a multifunction peripheral (MFP) device with a plurality of functions, a system for allocating random access memory (RAM), the system comprising: a user interface for selecting a percentage of RAM allocated for document formats; an allocator to allocate the selected percentage of RAM; and, RAM allocated to the temporary storage of documents by document format wherein the user interface supplies prompts for selecting the percentage of RAM allocation for a document format selected from the group including post script (PS) documents, printer control language (PCL) documents; tagged image file format (TIFF) documents, and portable document format (PDF) documents.

12. The system of claim 11 further comprising:
an MFP front panel display;
wherein the user interface is a graphical user interface (GUI) to present RAM allocation options on the display; and,
wherein the allocator allocates RAM for document formats in response to GUI prompts on the display.

13. The system of claim 12 further comprising:
a computer workstation including a browser and a display that are network-connected to the MFP; and,
wherein the user interface includes an embedded web server in the MFP, responsive to computer workstation browser requests, to supply a GUI on the computer workstation display presenting RAM allocation options.

14. The system of claim 11 wherein the allocator operates within predetermined ranges to limit each RAM allocation.

15. The system of claim 11 wherein the user interface presents a memory configuration table GUI cross-referencing document formats to their respective RAM allocations; and,
wherein the allocator allocates RAM for document formats in response to the memory configuration table GUI.

16. The system of claim 11 wherein the allocator is rebooted following the allocation of RAM for document formats, to distribute the RAM allocations.

17. The system of claim 11 wherein the user interface supplies prompts to prioritize the document formats; and,
wherein the allocator allocates additional RAM to a contending document formats with the higher priority, in the event of contention for RAM between document formats.

18. The system of claim 11 further comprising:
a memory to store selected RAM allocations as a plurality of allocation files; and,
wherein the user interface supplies prompts to select stored allocation profiles from the memory.

19. The system of claim 11 wherein the user interface supplies a GUI of predetermined allocation tables; and,
wherein the allocator allocates RAM for document formats in response to allocation table interface prompts.

20. In a multifunction peripheral (MFP) device, a system for allocating random access memory (RAM), the system comprising: a user interface to select the percentage RAM allocated to a document format; an allocator for the allocation of RAM, responsive to the user interface selections; and, RAM allocated to the temporary storage of documents for processing by the MFP wherein the user interface selects the allocation of RAM for a document format selected from the group including post script (PS) documents, printer control language (PCL) documents; tagged image file format (TIFF) documents, and portable document format (PDF) documents.

* * * * *